(12) United States Patent
Shi et al.

(10) Patent No.: US 11,971,324 B2
(45) Date of Patent: Apr. 30, 2024

(54) METHOD FOR CHECKING OR TESTING THE PROFILE OF THE PATH OF CONTACT OF INVOLUTE HELICAL CYLINDRICAL GEARS

(71) Applicant: BEIJING UNIVERSITY OF TECHNOLOGY, Beijing (CN)

(72) Inventors: Zhaoyao Shi, Beijing (CN); Yanqiang Sun, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/202,953

(22) Filed: May 29, 2023

(65) Prior Publication Data

US 2024/0044742 A1 Feb. 8, 2024

Related U.S. Application Data

(63) Continuation of application No. PCT/CN2022/072663, filed on Jan. 19, 2022.

(30) Foreign Application Priority Data

Dec. 21, 2020 (CN) .......................... 202011542413.4

(51) Int. Cl.
*G01M 13/021* (2019.01)
(52) U.S. Cl.
CPC ................................. *G01M 13/021* (2013.01)
(58) Field of Classification Search
CPC .. G01M 13/021; G01M 13/02; G01M 13/026; G01M 13/025; G01M 13/028;
(Continued)

(56) References Cited

U.S. PATENT DOCUMENTS 3,757,425 A * 9/1973 Bouillon .................. G01B 7/28
33/501.18
4,166,323 A * 9/1979 Maag ..................... G01B 7/008
33/551
(Continued)

FOREIGN PATENT DOCUMENTS

CN 2255039 Y 5/1997
CN 101419066 A 4/2009
(Continued)

OTHER PUBLICATIONS

International Search Report of PCT/CN2022/072663.
(Continued)

*Primary Examiner* — Andre J Allen
(74) *Attorney, Agent, or Firm* — J.C. PATENTS (57) ABSTRACT

A method for checking or testing the profile of the path of contact of involute helical cylindrical gears is disclosed. The crossed helical gear transmits motion through the profile of the path of contact, and checking or testing the profile of the path of contact can reflect the transmission quality and working stability of the gear and the actual motion condition. In the gear hobbing, the grinding, the shaving and other generating machining, the movement of tools and gears is achieved based on the profile of the path of contact, and controlling the profile of the path of contact has unique advantages in controlling the quality of gear processing.

1 Claim, 5 Drawing Sheets

(58) Field of Classification Search
CPC .... G01M 13/023; G01M 13/04; G01M 13/00;
G01M 7/00; G01M 13/022; G01M
13/027; G01M 17/022; G01M 7/045;
G01M 7/08; G01M 15/044; G01B 5/20;
G01B 7/283; G01B 5/202; G01B 7/28;
G01B 11/2416; G01B 21/20; G01B
5/163; G01B 5/166; G01B 7/146; G01B
5/0002; G01B 5/008; G01B 11/245;
G01B 11/30; G01B 3/48; G01B 5/012;
G01B 5/14; G01B 5/146; G01B 5/242;
G01B 9/08; G01B 11/14
USPC .......................................................... 73/162
See application file for complete search history.

(56) References Cited

U.S. PATENT DOCUMENTS

| | | | | |
|---|---|---|---|---|
| 4,276,699 | A * | 7/1981 | Sterki | G01B 7/283 |
| | | | | 33/501.9 |
| 5,231,875 | A * | 8/1993 | Honda | G01M 13/021 |
| | | | | 702/56 |
| 5,513,442 | A | 5/1996 | Flair | |
| 11,262,190 | B2 * | 3/2022 | Wagaj | G01B 11/005 |
| 2011/0179659 | A1 * | 7/2011 | Yuzaki | G01B 5/202 |
| | | | | 33/501.9 |
| 2015/0338201 | A1 * | 11/2015 | Wuerfel | B23F 23/006 |
| | | | | 33/504 |
| 2022/0236142 | A1 * | 7/2022 | Finkeldey | G01M 13/021 |

FOREIGN PATENT DOCUMENTS

| | | | |
|---|---|---|---|
| CN | 101476980 | A | 7/2009 |
| CN | 103712795 | A | 4/2014 |
| CN | 104697421 | A | 6/2015 |
| CN | 113855033 | A | 10/2015 |
| CN | 105241415 | A | 1/2016 |
| CN | 107883871 | A * | 4/2018 |
| CN | 109443238 | A | 3/2019 |
| CN | 109751386 | A | 5/2019 |
| CN | 110081148 | A | 8/2019 |
| CN | 211820632 | U | 10/2020 |
| CN | 111879277 | A | 11/2020 |
| CN | 112798270 | A | 5/2021 |
| DE | 102016005210 | A1 | 11/2017 |
| EP | 3406940 | A1 | 11/2018 |

OTHER PUBLICATIONS

First Search Report of the priority application CN202011542413.4.
Supplemental Search Report of the priority application CN2020115424134.
First Office Action of the priority application CN202011542413.4.
NPL1: "The Contact Line Error and Profile of the Path of Contact of Helical Cylindrical Gears", authored by Shuixin Bai, 试验与研究 (Test and Study), Dec. 31, 1984, pp. 38-40, Figs. 1-4.
NPL2: 齿轮精度与 综合检验 (Gear Accuracy and Comprehensive Inspection), authored by Shuixin Bai, Jan. 31, 1986, pp. 1-17.
NPL3: "Analysis of the tooth-skipped meshing process of the external-meshing gear honing", Journal of Harbin Engineering University, vol. 38 No. 3, Mar. 2017, pp. 425-432.
NPL4: "Research on the Profile Error of Helical Cylindrical Gears", Journal of Xi'an University of Technology, No. 2, Dec. 31, 1984, pp. 14-20.
NPL5: "The Contact Line Error and Profile of the Path of Contact of Helical Cylindrical Gears", 工具技术 ( Tool Technique), vol. 9, Sep. 30, 1984, pp. 38-43.
NPL6: "A Generalized Cylindrical—coordinate Method for Measuring Deviation of Contact Line of Involute Helicoid", Aviation Precision Manufacturing Technology, vol. 39, No. 2, Apr. 30, 2003, pp. 34-36.
NPL7: "Some Calculations in the Measurement of Helical Cylindrical Gears", 计量技术 (Measurement Technique), vol. 5, May 51, 1987, pp. 13-16.
NPL8: "Analysis of Tolerance Zones for Tooth Profile Errors of Involute Cylindrical Gears", 科学咨询 (Science Advisory), vol. 7, No. 19, pp. 72-73.
NPL9: "Involute Arc Cylindrical Gear and Its Mesh Characteristics", 中国机械工程 (China Mechanical Engineering), vol. 17, No. 18, Sep. 30, 2006, pp. 1888-1891.

* cited by examiner

METHOD FOR CHECKING OR TESTING THE PROFILE OF THE PATH OF CONTACT OF INVOLUTE HELICAL CYLINDRICAL GEARS

CROSS-REFERENCE TO RELATED APPLICATIONS

This application is a continuation of International Application No. PCT/CN2022/072663, filed on Jan. 19, 2022, which claims priority to Chinese Patent Application No. 202011542413.4, filed on Dec. 21, 2020, both of which are hereby incorporated by reference in their entireties.

TECHNICAL FIELD

The present application relates to related technologies of gear measurement, and studies a method for checking or testing the profile of the path of contact of involute helical cylindrical gears. It specifically involves the coordinate measurement method of the profile of the path of contact of involute helical cylindrical gears, so as to compensate for the lack of measurement function for the profile of the path of contact in existing gear measuring instruments.

BACKGROUND TECHNOLOGY

As an important basic transmission component, gears have the advantages of high load-bearing capacity, high transmission accuracy, and constant transmission power, which have become key components used to transmit motion and power in various mechanical equipment. Therefore, it is very important to ensure gear quality for improving performance and promoting widespread application.

Figure 1:
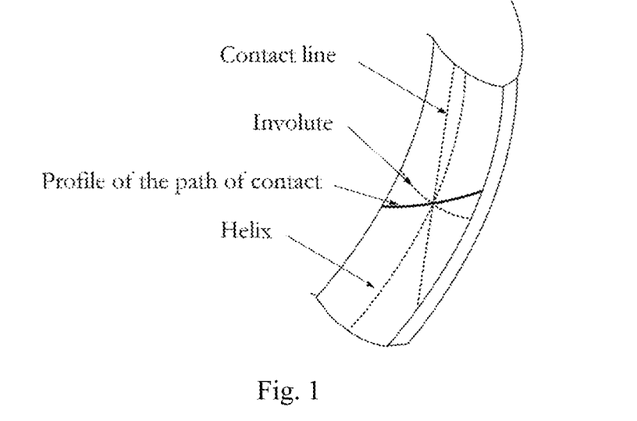
FIG. 1 shows four characteristic curves on the involute helicoid.

The tooth surface of an involute cylindrical gear is an involute helical surface, and there are four common characteristic lines, including the involute, the helix, the profile of the path of contact (PPC), and the contact line, as shown in FIG. 1. In current international and national standards, the evaluation of gear tooth surface quality is achieved by measuring involutes and helixes. In fact, as a characteristic line with distinct engineering significance on the tooth surface, the PPC has unique value and is worthier of attention.

The tooth surface is in point contact for the crossed helical gear, and the sum of the intersecting points of driven gear and driving gear define the PPC. Therefore, the crossed helical gear pair transfers motion through the PPC. The PPC is the working curve of the gear tooth surface, which can reflect the actual running condition of the gear. In the gear hobbing, the grinding, the shaving and other generating machining, theoretically, the generating motion is also based on the meshing principle of the crossed helical gear pair. The contact trace between the tool and the workpiece gear is also the PPC. Therefore, in the generating machining of the gear, the PPC is the machining curve of the tooth surface. It is of advantage to control the machining quality of gears through controlling the PPC.

The PPC, as the working curve and forming curve on the tooth surface, is of uniqueness. In essence, the PPC is the hybrid result of the involute and the helix, which can better characterize the quality of gears. It can not only be used for analyzing gear process errors, but also for predicting the dynamic performance of gears.

So far, several gear accuracy standards (such as ISO, AGMA, GB and so on) have defined involute profile deviation and helix deviation as accuracy indicators to control tooth surface quality. The gear measuring center (GMC), the coordinate measuring machine (CMM) and other instruments are developed to measure the involute profile deviation and helix deviation, and a comprehensive evaluation method is proposed. However, there is no method and instrument for measuring the deviation of the PPC.

Therefore, based on the current situation and problems of gear measurement mentioned above, a method for checking or testing the PPC of involute helical cylindrical gears is proposed, which can be achieved through the gear measuring instruments.

INVENTION CONTENT

The embodiment of the invention will provide a method for checking or testing the PPC of involute helical cylindrical gears, so as to enhance compensate for the lack of measurement function for the PPC in gear measuring instruments and effectively obtain true information that can reflect the quality of gear transmission and processing.

Figure 2:
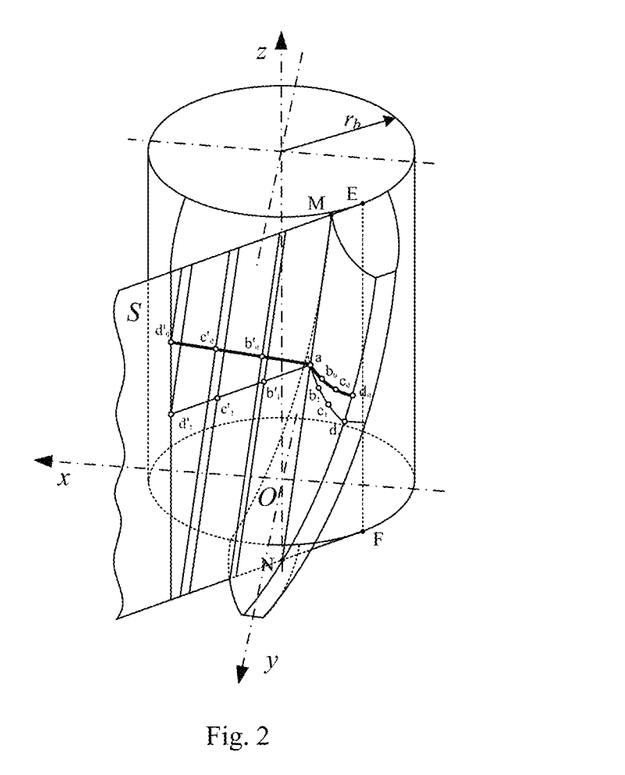
FIG. 2 shows PPC on the tooth surface of the tested gear.

In FIG. 2, a coordinate system $\delta$ (O–x, y, z) is established, where $\delta$ is the name of the coordinate system, O is the symmetrical center of the measured gear, and x, y, and z are the three coordinate axes in the coordinate system $\delta$ respectively. The z-axis coincides with the central axis of the tested gear, and $r_b$ is the base cylindrical radius of the tested gear. The plane S is the tangent plane of the base cylinder of the tested gear, which is tangent to the straight-line EF and intersects with the involute helical tooth surface of the tested gear at the straight-line MN. The straight-line MN is the generatrix of the involute spiral tooth surface of the tested gear. In the process of involute gear transmission, the straight-line $ad'_0$ is the action line of the tested gear, which is used to transmit displacement and force. The action line $ad'_0$ is located in the tangent plane S and perpendicular to the generatrix MN of the involute spiral tooth surface. The trajectory of the intersection points between the action line $ad'_0$ and the involute spiral tooth surface of the tested gear is the PPC ado.

The PPC has the advantage of complying with the principle of action line based on the meshing principle, and is the only curve on the tooth surface that participates in meshing motion. The crossed helical gear transmits motion through the PPC, and its measurement error reflects the actual motion conditions of the tested gear, such as transmission quality and working stability. And when checking or testing the PPC, the measurement direction is perpendicular to the tooth surface of the tested gear, which can achieve high measurement accuracy. In the gear hobbing, the grinding, the shaving and other generating machining, the movement of tools and gears is achieved by machining the PPC. Controlling the PPC has unique advantages in controlling the quality of gear machining. The PPC has shown irreplaceable advantages in the involute helical cylindrical gear transmission and processing, but currently, the measuring instruments do not have the measurement function of the PPC.

Therefore, the present invention relates to a method for checking or testing the PPC of involute helical cylindrical gears, which can be achieved through the gear measuring instruments.

Figure 3:
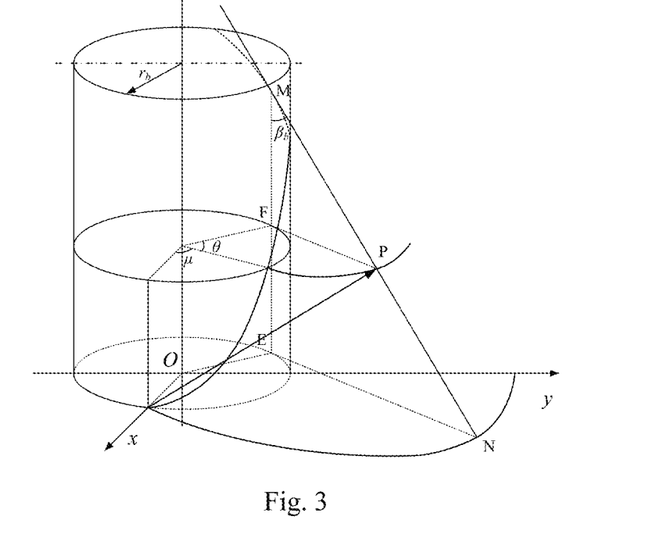
FIG. 3 shows model of involute helicoid.

The involute helicoid is a spatial curved surface formed by a straight line rolling along the base cylinder. This line is tangent to the base cylinder and maintain a fixed angle with the gear axis, as shown in FIG. 3.

Any point P on the tooth surface can be expressed as $$\begin{cases} x = r_b\cos(\mu + \theta) + \theta r_b\sin(\mu + \theta) \\ y = r_b\sin(\mu + \theta) - \theta r_b\cos(\mu + \theta) \\ z = z \end{cases} \quad (1)$$

Where, x, y, and z are the three-dimensional coordinate values under the coordinate system δ (O–x, y, z). $r_b$ is the radius of the base cylinder. θ is the sum of the involute generating angle and the pressure angle. $\mu = z\tan\beta_b/r_b$, and $\beta_b$ is the base helix angle.

In the crossed helical gear transmission, when the involute helical surface of the tested gear rotates around the z-axis along with coordinate system δ (O–x, y, z), there is an instantaneous contact point on the involute helical surface at each corresponding rotation angle.

The trajectory of the contact points on the involute helical surface in coordinate system δ (O–x, y, z) is the PPC.

In the process of gear meshing transmission, the following equation is determined, including the action line of the gear (Eq. 2) and the PPC on the tooth surface (Eq. 3).

$$\begin{cases} x = r_b\left[\cos\alpha_t + (\alpha_t - \psi + \tan\alpha_t\tan^2\beta_b)\cos^2\beta_b\sin\alpha_t\right] \\ y = r_b\left[\sin\alpha_t - (\alpha_t - \psi + \tan\alpha_t\tan^2\beta_b)\cos^2\beta_b\cos\alpha_t\right] \\ z = r_b(\alpha_t - \psi - \tan\alpha_t)\cos\beta_b\sin\beta_b \end{cases} \quad (2)$$

$$\begin{cases} x = r_b\cos(\alpha_t - \psi) + r_b(\alpha_t - \psi + \tan\alpha_t\tan^2\beta_b)\cos^2\beta_b\sin(\alpha_t - \psi) \\ y = r_b\sin(\alpha_t - \psi) - r_b(\alpha_t - \psi + \tan\alpha_t\tan^2\beta_b)\cos^2\beta_b\cos(\alpha_t - \psi) \\ z = r_b(\alpha_t - \psi - \tan\alpha_t)\cos\beta_b\sin\beta_b \end{cases} \quad (3)$$

Where, ψ is the rotation angle, and $\alpha_i = \mu + \theta + \psi$.

The traditional gear measurement method is to inspect the involute on the involute helical tooth surface of the tested gear, which is a two-axis control method. That is to say, when the measured gear rotates at a certain speed, the probe of the measuring instrument only moves synchronously along the tangent plane of the base cylinder of the tested gear, which can achieve information data collection of the involute. This traditional method has a simple principle and is easy to implement. But the measurement accuracy is easily affected by the size of the tested gear. When measuring the involute of the involute helical cylindrical gear, the measurement direction is not perpendicular to the tested gear tooth surface, which will bring measurement error. The larger the helix angle of the tested gear, the greater the measurement error and the worse the measurement accuracy.

The measurement method involved in the present invention is to measure the PPC on the involute helical tooth surface of the tested gear, which is a four-axis control method. That is to say, when the tested gear rotates at a certain speed, the probe of the measuring instrument not only synchronously moves along the tangential direction within the tangent plane of the base cylinder of the tested gear, but also synchronously superimposes radial and axial movements. Therefore, the probe moves along the action line within the tangent plane of the base cylinder of the tested gear according to the proportional relationship of Eq. 4, and the collected tooth surface information data is the PPC on the involute helical tooth surface of the tested gear.

$$\begin{cases} x = A_1 \cdot \psi + B_1 \\ y = A_2 \cdot \psi + B_2 \\ z = A_3 \cdot \psi + B_3 \end{cases} \quad (4)$$

Where, $A_1, A_2, A_3, B_1, B_2$ and $B_3$ are constant coefficients, i.e.

$A_1 = -r_b\cos^2\beta_b\cos\alpha_t, B_1 = r_b[\cos\alpha_t + (\alpha_t + \tan\alpha_t\tan^2\beta_b)\cos^2\beta_b\sin\alpha_t]$ $A_2 = r_b\cos^2\beta_b\cos\alpha_t, B_2 = r_b[\sin\alpha_t - (\alpha_t + \tan\alpha_t\tan^2\beta_b)\cos^2\beta_b\cos\alpha_t]$ $A_3 = -r_b\cos\beta_b\sin\beta_b, B_3 = r_b(\alpha_t - \tan\alpha_t)\cos\beta_b\sin\beta_b$ The four-axis control method for measuring the PPC on the gear tooth surface can also have the following extended applications.

(1) Three-Axis Control Method for Measuring the PPC

Figure 4:
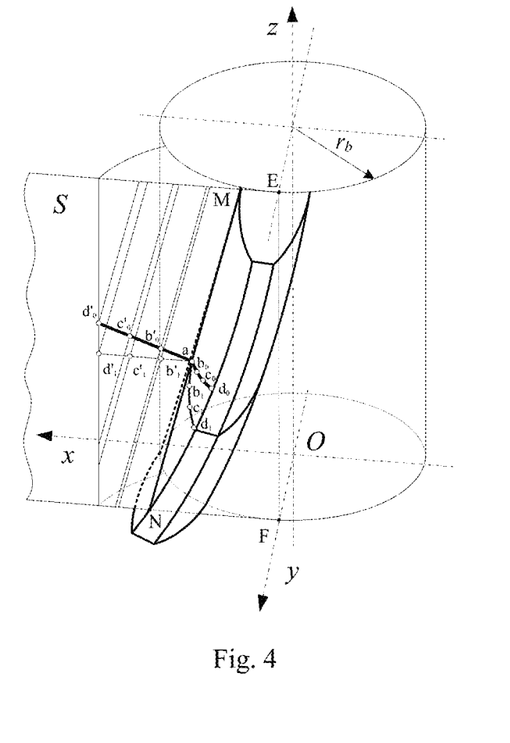
FIG. 4 shows PPC on the tooth surface of the tested gear when $y=r_b$.

If $y = r_b$, that is, the tangent plane S of the base cylinder of the tested gear is perpendicular to the y-axis in the coordinate system δ, as shown in FIG. 4. Therefore, Eq. 4 is simplified to Eq. 5.

$$\begin{cases} x = A_1 \cdot \psi + B_1 \\ y = r_b \\ z = A_3 \cdot \psi + B_3 \end{cases} \quad (5)$$

In the meshing transmission of the tested involute helical cylindrical gear, the action line $ad'_0$ is a straight line in the tangent plane S perpendicular to the y-axis, and the trajectory of the intersection point with the involute helical tooth surface of the tested gear is the PPC.

Therefore, the four-axis control method can be simplified as three-axis control method. That is to say, when the tested gear rotates at a certain speed, the probe of the measuring instrument not only synchronously moves along the tangential direction (x-axis direction) within the tangent plane S of the base cylinder of the tested gear, but also synchronously superimposes the axial movement (z-axis direction).

(2) Normal Generation Method for Measuring the Involute Profile

If the z-axis is fixed at a certain position in the four-axis control method, i.e. $z = z_0$, Eq. 4 is simplified to Eq. 6. When the tested gear rotates at a certain speed, the probe of the measuring instrument synchronously moves along the tangential direction (x-axis direction) and radial direction (y-axis direction) within the tangent plane S of the base cylinder of the tested gear.

$$\begin{cases} x = A_1 \cdot \psi + B_1 \\ y = A_2 \cdot \psi + B_2 \\ z = z_0 \end{cases} \quad (6)$$

At this point, the probe of the measuring instrument will move along the straight-line $ad_1$ in the tangent plane S of the base cylinder of the tested gear to measure the involute $ad_1$ on the tooth surface, as shown in FIG. 2.

This method effectively avoids the impact of the tested gear size on measurement accuracy and reduces the requirement for the accuracy of the measuring instrument's guide rail. It is an efficient and high-precision involute measurement method.

(3) Conventional Method for Measuring the Involute Profile

Based on the normal generation method for measuring the involute profile, the tangent plane of the base cylinder is rotated to be perpendicular to the y-axis, and Eq. 4 is simplified to Eq. 7.

$$\begin{cases} x = A_1 \cdot \psi + B_1 \\ y = r_b \\ z = z_0 \end{cases} \quad (7)$$

This is the conventional method for measuring the involute profile, which is the two-axis control method.

The Method for checking or testing the PPC of involute helical cylindrical gears in the embodiment of the invention have the following advantages:

1) This method can be able to measure the PPC on the tooth surface of the tested gear. The crossed helical gear is transmitted through the PPC, and it can reflect the actual motion conditions of the gear though checking or testing the PPC, such as transmission quality and working stability.
2) This method can be able to measure the PPC on the tooth surface of the tested gear. In gear hobbing, the grinding, the shaving and other generating machining, the movement of tools and gears is achieved based on the PPC. Controlling the PPC has unique advantages in controlling the quality of gear machining.
3) This method can be able to measure the PPC on the tooth surface of the tested gear through the existing GMC and CMM, breaking the traditional two-axis method. This method compensates for the lack of measurement function for the PPC in gear measuring instruments, which effectively improves the measurement accuracy easily affected by the size of the tested gear.
4) The measurement direction of this method is perpendicular to the tooth surface of the tested gear, which can achieve high measurement accuracy and effectively obtain true information that can reflect the quality of gear transmission and machining.
5) Three-axis control method for measuring the PPC ensures high precision and efficiency. Normal generation method for measuring the involute profile can provide a new approach for involute measurement, effectively avoiding the impact of tested gear size on involute measurement accuracy.
6) This method is also applicable to the measurement of spur cylindrical gears, where the PPC on the gear tooth surface coincides with the involute, so this method is also applicable.

In FIG. 1. Base, 2. X-axis linear moving group, 3. Z-axis linear moving group, 4. Y-axis linear moving group, 5. Rotating group, 6. Adjustment mechanism of tested gear, 7. Fixed center of tested gear, 8. Fixed mandrel of tested gear, 9. Tested gear, 10. Probe, 21. X-axis base, 22. X-axis slider, 23. X-axis motor, 24. X-axis grating 24, 31. Z-axis base, 32. Z-axis slider, 33. Z-axis motor 3, 34 Z-axis grating, 41. Y-axis base, 42. Y-axis slider, 43. Y-axis motor, 44. Y-axis grating, 51. Rotating shaft motor, 52. Rotating shaft grating.

Specific Implementation Mode

The embodiments of the present application will be described in detail in combination with the accompanying drawings. However, it should not be understood that the scope of the above-mentioned subject matter of the present invention is limited to the following implementation methods, and any technology implemented based on the content of the present invention belongs to the scope of the present invention.

In FIG. 2, a coordinate system $\delta$ (O–x, y, z) is established, where $\delta$ is the name of the coordinate system, O is the symmetrical center of the measured gear, and x, y, and z are the three coordinate axes in the coordinate system $\delta$ respectively. The z-axis coincides with the central axis of the tested gear, and $r_b$ is the base cylindrical radius of the tested gear. The plane S is the tangent plane of the base cylinder of the tested gear, which is tangent to the straight-line EF and intersects with the involute helical tooth surface of the tested gear at the straight-line MN. The straight-line MN is the generatrix of the involute spiral tooth surface of the tested gear. In the process of involute gear transmission, the straight-line $ad'_0$ is the action line of the tested gear, which is used to transmit displacement and force. The action line $ad'_0$ is located in the tangent plane S and perpendicular to the generatrix MN of the involute spiral tooth surface. The trajectory of the intersection points between the action line $ad'_0$ and the involute spiral tooth surface of the tested gear is the PPC $ad_0$.

The PPC has the advantage of complying with the principle of action line based on the meshing principle, and is the only curve on the tooth surface that participates in meshing motion.

The crossed helical gear transmits motion through the PPC, and its measurement error reflects the actual motion conditions of the tested gear, such as transmission quality and working stability. And when checking or testing the PPC, the measurement direction is perpendicular to the tooth surface of the tested gear, which can achieve high measurement accuracy. In the gear hobbing, the grinding, the shaving and other generating machining, the movement of tools and gears is achieved by machining the PPC. Controlling the PPC has unique advantages in controlling the quality of gear machining. The PPC has shown irreplaceable advantages in the involute helical cylindrical gear transmission and processing, but currently, the measuring instruments do not have the measurement function of the PPC.

Figure 5:
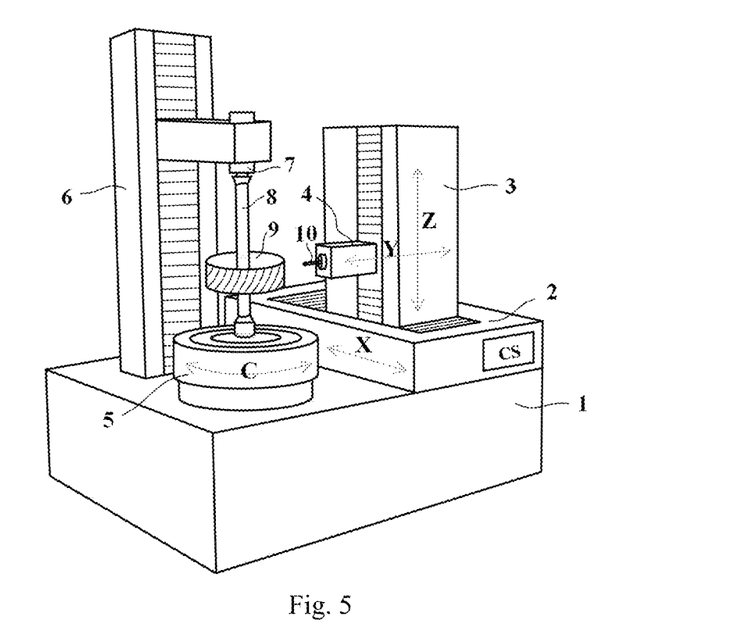
FIG. 5 shows simplified three-dimensional schematic diagram of gear measuring instruments.
Figure 6:
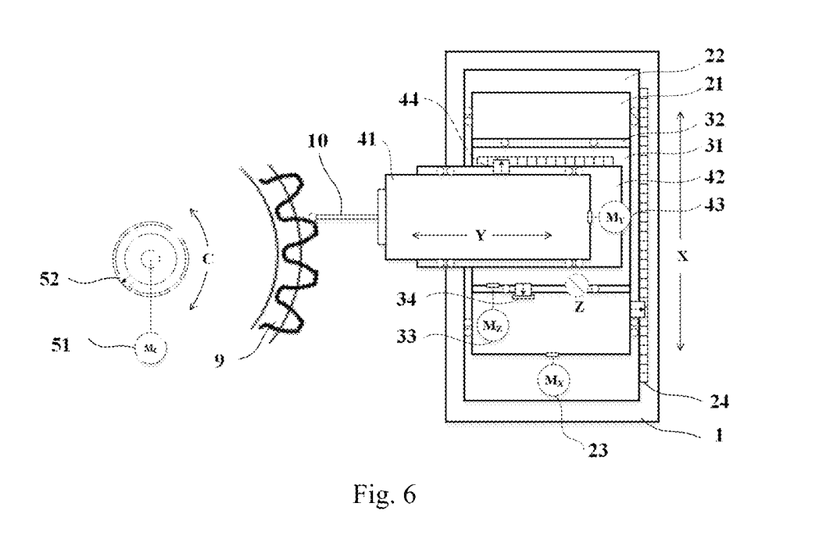
FIG. 6 shows simplified three-dimensional schematic diagram of gear measuring instruments (vertical view)

As shown in FIG. 5 and FIG. 6, the measuring instrument includes base 1, X-axis linear moving group 2, Z-axis linear moving group 3, Y-axis linear moving group 4, rotating group 5, adjustment mechanism of the tested gear 6, fixed center of the tested gear 7, fixed mandrel of the tested gear 8, tested gear 9, probe 10, and computer control device CS.

The X-axis linear moving group 2 includes X-axis base 21, X-axis slider 22, X-axis motor 23, and X-axis grating 24. The Z-axis linear moving group 3 includes Z-axis base 31, Z-axis slider 32, Z-axis motor 33, and Z-axis grating 34. The Y-axis linear moving group 4 includes Y-axis base 41, Y-axis slider 42, Y-axis motor 43, and Y-axis grating 44. The rotating group 5 includes rotating shaft motor 51 and rotating shaft grating 52.

Three linear moving groups (2,3,4), rotating group 5, and adjustment mechanism of the tested gear 6 are installed on base 1.

The tested gear 9 is installed on the rotating group 5 through adjustment mechanism of the tested gear 6, fixed center of the tested gear 7, and fixed mandrel of the tested gear 8. The rotating shaft motor 51 is connected to the tested gear 9, and it can drive the tested gear 9 to achieve uniform rotation. The rotating shaft motor 51 is precisely controlled by the computer control device CS to achieve rotation of the tested gear 9 at any angle. The rotation angle can be monitored in real-time by the rotating shaft grating 52 and fed back to the computer control device CS.

The probe 10 is arranged opposite the tested gear 9 and can move in three coordinate directions. The probe 10 is installed on the Y-axis slider 42 connected to the Y-axis motor 43 to achieve linear movement along the Y-axis direction. At the same time, its linear movement can be monitored and fed back in real-time by the Y-axis grating 44. The Y-axis slider 42 is installed on the Y-axis base 41, and the Y-axis motor 43 and Y-axis grating 44 are also installed on the Y-axis base 41. The Y-axis linear moving group 4 is installed on the Z-axis slider 32 connected to the Z-axis motor 33 to achieve vertical movement along the Z-axis direction. At the same time, its linear movement can be monitored and fed back in real-time by the Z-axis grating 34. The Z-axis slider 32 is installed on the Z-axis base 31, and the Z-axis motor 33 and Z-axis grating 34 are also installed on the Z-axis base 31. The Z-axis linear moving group 3 is installed on the X-axis slider 22 connected to the X-axis motor 23 to achieve linear movement along the X-axis direction. At the same time, its linear movement can be monitored and fed back in real-time by the X-axis grating 24. The X-axis slider 22 is installed on the X-axis base 21, and the X-axis motor 23 and X-axis grating 24 are also installed on the X-axis base 21. The X-axis linear moving group 2 is installed on the base 1 of the measuring instrument.

Figure 7:
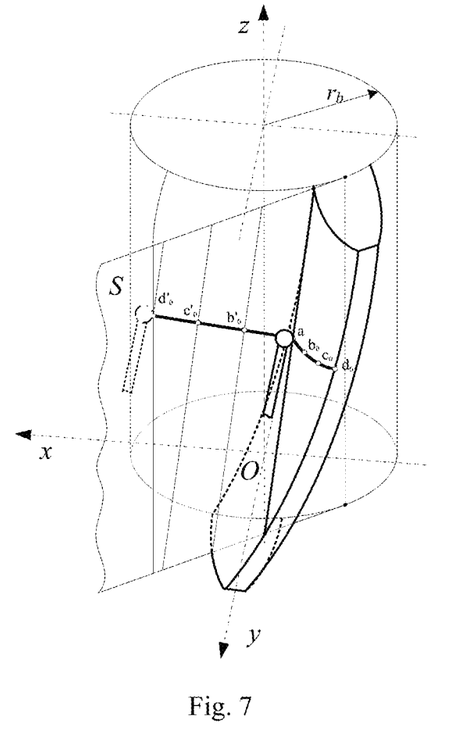
FIG. 7 shows schematic diagram of the position of the probe when measuring the PPC.

As shown in FIG. 7, the measurement scheme of the invention involves checking or testing the PPC $ad_0$ on the involute helical tooth surface of the tested gear, which is a four-axis control method. When the tested gear rotates at a constant speed, the probe 10 of the measuring instrument starts from point a on the involute helical tooth surface, and not only synchronously moves along the X-axis direction in the tangent plane S of the base cylinder of the tested gear, but also synchronously overlaps the movements in the Y-axis direction and Z-axis direction. The probe 10 of the measuring instrument moves to point do and ends along the action line within the tangent plane of the base cylinder of the tested gear according to the proportional relationship of Eq. 8.

$$\begin{cases} x = A_1 \cdot \psi + B_1 \\ y = A_2 \cdot \psi + B_2 \\ z = A_3 \cdot \psi + B_3 \end{cases} \tag{8}$$

Where, $A_1, A_2, A_3, B_1, B_2$ and $B_3$ are constant coefficients, i.e.

$A_1 = -r_b \cos^2\beta_b \cos\alpha_t, B_1 = r_b[\cos\alpha_t + (\alpha_t + \tan\alpha_t \tan^2\beta_b)\cos^2\beta_b \sin\alpha_t]$ $A_2 = r_b \cos^2\beta_b \cos\alpha_t, B_2 = r_b[\sin\alpha_t - (\alpha_t + \tan\alpha_t \tan^2\beta_b)\cos^2\beta_b \cos\alpha_t]$ $A_3 = -r_b \cos\beta_b \sin\beta_b, B_3 = r_b(\alpha_t - \tan\alpha_t)\cos\beta_b \sin\beta_b$ At this point, the tooth surface information data collected by the probe 10 is the PPC $ad_0$ on the involute helical tooth surface of the tested gear. The above process requires the computer control device CS to accurately control the synchronous motion of X-axis motor 23, Z-axis motor 33, and rotating axis motor 51 simultaneously in order to achieve the entire measurement process.

The four-axis control method for measuring the PPC on the gear tooth surface can also have the following extended applications.

(1) Three-Axis Control Method for Measuring the PPC

If $y=r_b$, that is, the tangent plane S of the base cylinder of the tested gear is perpendicular to the y-axis in the coordinate system δ, as shown in FIG. 4. Therefore, Eq. 8 is simplified to Eq. 9.

$$\begin{cases} x = A_1 \cdot \psi + B_1 \\ y = r_b \\ z = A_3 \cdot \psi + B_3 \end{cases} \tag{9}$$

In the meshing transmission of the tested involute helical cylindrical gear, the action line $ad'_0$ is a straight line in the tangent plane S perpendicular to the y-axis, and the trajectory of the intersection point with the involute helical tooth surface of the tested gear is the PPC.

Therefore, the four-axis control method can be simplified as three-axis control method. That is to say, when the tested gear rotates at a certain speed, the probe of the measuring instrument not only synchronously moves along the tangential direction (x-axis direction) within the tangent plane S of the base cylinder of the tested gear, but also synchronously superimposes the axial movement (z-axis direction).

In addition, when measuring the meshing error of gear hobs, it is also carried out along the direction of the action line in the tangent plane of the base cylinder, which belongs to the three-axis control method mentioned above.

(2) Normal Generation Method for Measuring the Involute Profile

If the z-axis is fixed at a certain position in the four-axis control method, i.e. $z=z_0$, Eq. 8 is simplified to Eq. 10. When the tested gear rotates at a certain speed, the probe of the measuring instrument synchronously moves along the tangential direction (x-axis direction) and radial direction (y-axis direction) within the tangent plane S of the base cylinder of the tested gear.

$$\begin{cases} x = A_1 \cdot \psi + B_1 \\ y = A_2 \cdot \psi + B_2 \\ z = z_0 \end{cases} \tag{10}$$

At this point, the probe of the measuring instrument will move along the straight-line $ad_1$ in the tangent plane S of the base cylinder of the tested gear to measure the involute $ad_1$ on the tooth surface, as shown in FIG. 2.

This method effectively avoids the impact of the tested gear size on measurement accuracy and reduces the requirement for the accuracy of the measuring instrument's guide rail. It is an efficient and high-precision involute measurement method.

Figure 8A:
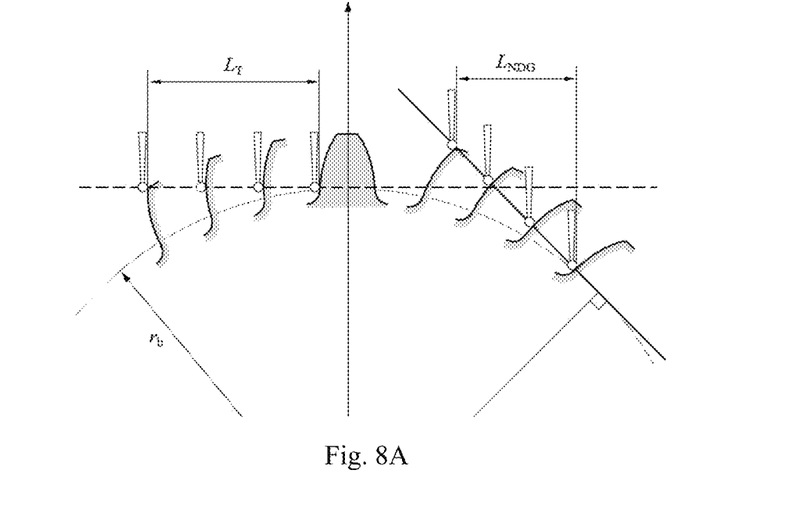
FIGS. 8A, 8B and 8C show an example of the normal generation method for measuring the involute profile.

For the measurement of large-sized gears, higher requirements are put forward for the size of the measuring instrument itself, which requires tangential movement with a large stroke. Undoubtedly, the difficulty of processing, assembling, debugging, and using for large-sized gear measuring instruments is enormous. The normal generation method for measuring the involute profile can significantly shorten the stroke of the tangential guide rail when measuring gears (see FIG. 8A), and the larger the size of the gear, the more obvious the advantage.

Figure 8B:
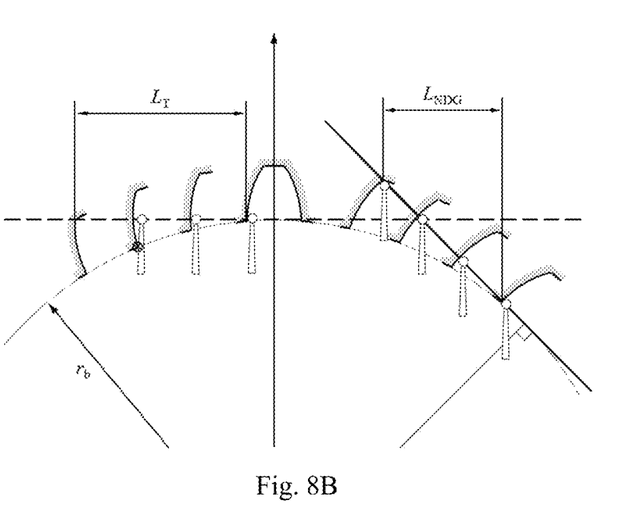

For the measurement of internal gears, due to the geometric characteristics of the internal gears themselves, the measuring ball or rod of the measuring instrument is prone to interference with the tooth surface during the measurement process (FIG. 8B). The normal generation method for measuring the involute profile can not only effectively avoid mechanical interference issues, but also improve the inconvenience of frequent replacement of probs with different diameters due to different module internal gear measurements.

Figure 8C:
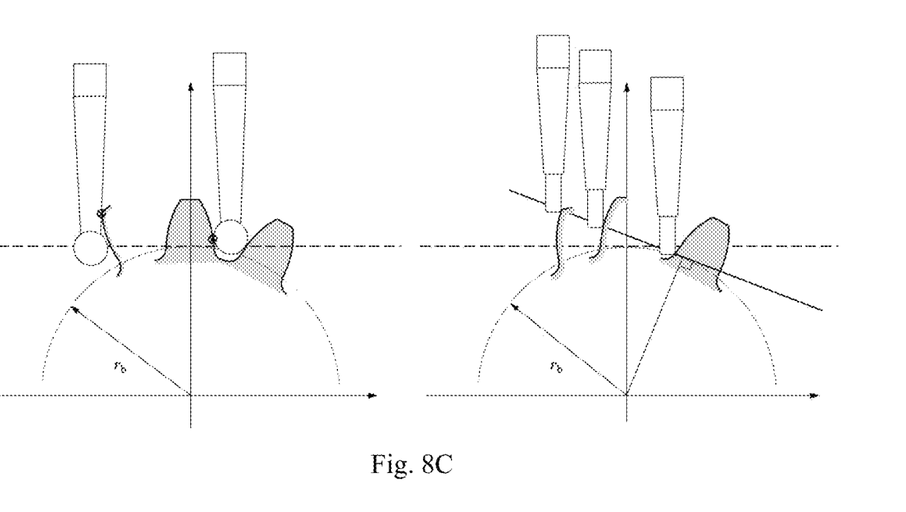

For the measurement of micro module gears, due to the small size of the gears and the small gap between the teeth, it is difficult for traditional measuring instruments to enter the teeth for normal measurement, and there is also a high possibility of interference between the measuring ball or rod and the tooth surface during the measurement process (FIG. 8C). The normal generation method for measuring the involute profile can be carried out with cylindrical measuring needles that are easier to manufacture in smaller sizes to achieve involute profile measurement of small module gears.

Therefore, normal generation method for measuring the involute profile is an effective and feasible solution that can balance the compact structural layout, high measurement efficiency and accuracy in the measurement of large-sized gears, internal gears, and micro module gears.

(3) Conventional Method for Measuring the Involute Profile

Based on the normal generation method for measuring the involute profile, the tangent plane of the base cylinder is rotated to be perpendicular to the y-axis, and Eq. 8 is simplified to Eq. 11.

$$\begin{cases} x = A_1 \cdot \psi + B_1 \\ y = r_b \\ z = z_0 \end{cases} \quad (11)$$

This is the conventional method for measuring the involute profile, which is the two-axis control method.

The PPC, as a typical characteristic line of the involute helical tooth surface of the tested gear, has uniqueness. The crossed helical gear is transmitted through PPC, and measuring the PPC can reflect the actual motion conditions of the gear, such as transmission quality and working smoothness. In the gear hobbing, the grinding, the shaving and other generating machining, the movement of tools and gears is achieved based on the PPC. Measuring the PPC has unique advantages in controlling the quality of gear machining. The PPC is checked or tested through the gear measuring instrument, which compensates for the shortcomings of existing measurement equipment that cannot measure the PPC. Breaking the traditional two-axis linkage control method, the four-axis control method effectively improves its measurement accuracy easily affected by the size of the tested gear. In addition, the three-axis control method for measuring the PPC is a simplified method by limiting the radial movements (Y-axis direction). And the normal generation method and the conventional method for measuring the involute profile can be achieved by limiting the radial (Y-axis direction) and axial (Z-axis direction) movements separately. At the same time, this method is also applicable to involute measurement of spur cylindrical gears.

The invention claimed is:

1. A method for checking or testing the profile of the path of contact of involute helical cylindrical gears, wherein a coordinate system δ (O–x, y, z) is established, where δ is the name of the coordinate system, O is a symmetrical center of a tested gear, and x, y, and z are three coordinate axes in the coordinate system δ respectively, the z-axis coincides with a central axis of the tested gear, and $r_b$ is a base cylindrical radius of the tested gear; plane S is a tangent plane of a base cylinder of the tested gear, which is tangent to a straight-line EF and intersects with an involute helical tooth surface of the tested gear at a straight-line MN; the straight-line MN is a generatrix of the involute helical tooth surface of the tested gear; in a process of involute gear transmission, a straight-line $ad'_0$ is an action line of the tested gear, which is used to transmit displacement and force; the action line is located in the tangent plane and perpendicular to the generatrix of the involute helical tooth surface; a trajectory of intersection points between the action line and the involute helical tooth surface of the tested gear is a profile of the path of contact $ad_0$;

the method comprising: measuring the profile of the path of contact on the involute helical tooth surface of the tested gear via a four-axis control scheme: when the tested gear rotates at a constant speed, a probe of a measuring instrument not only synchronously moves along a tangential direction within the tangent plane of the base cylinder of the tested gear, but also synchronously superimposes radial and axial movements; the probe moves along the action line within the tangent plane of the base cylinder of the tested gear, and collected tooth surface information data is the profile of the path of contact on the involute helical tooth surface of the tested gear;

when the tested gear rotates at a constant speed, the probe of the measuring instrument starts from point a on the involute helical tooth surface, and not only synchronously moves along X-axis direction in the tangent plane of the base cylinder of the tested gear, but also synchronously overlaps movements in Y-axis direction and Z-axis direction; the probe of the measuring instrument moves to point $d'_0$ and ends along the action line within the tangent plane of the base cylinder of the tested gear; tooth surface information data collected by the probe is the profile of the path of contact $ad_0$ on the involute helical tooth surface of the tested gear; a computer control device accurately controls synchronous motion of a X-axis motor, a Z-axis motor, and a rotating axis motor simultaneously in order to achieve entire measurement process;

the four-axis control scheme for measuring the profile of the path of contact on the involute helical gear tooth surface has the following extended applications:

(1) Three-axis control method for measuring the profile of the path of contact if $y=r_b$, that is, the tangent plane of the base cylinder of the tested gear is perpendicular to the y-axis in the coordinate system δ; in meshing transmission of the tested gear, the action line is a straight line in the tangent plane perpendicular to the y-axis, and the trajectory of the intersection point with the involute helical tooth surface of the tested gear is the profile of the path of contact $ad_0$; the four-axis control scheme can be simplified as three-axis control method: when the tested gear rotates at a constant speed, the probe of the measuring instrument not only synchronously moves along the tangential direction (the X-axis direction) within the tangent plane of the base cylinder of the tested gear, but also synchronously superimposes the axial movement (the Z-axis direction);

(2) Normal generation method for measuring the involute profile if the z-axis is fixed at a position in the four-axis control method, where $z=z_0$, the four-axis control scheme can be simplified as a normal generation method for measuring the involute profile; when the tested gear rotates at a constant speed, the probe of the measuring instrument synchronously moves along the tangential direction the X-axis direction) and radial direction (the Y-axis direction) within the tangent plane of the base cylinder of the tested gear; at this point, the probe of the measuring instrument will move along a straight-line $ad'_1$ in the tangent plane of the base cylinder of the tested gear to measure an involute $ad_1$ on the involute helical tooth surface.

* * * * *